United States Patent

Ekstrand

[15] 3,688,021

[45] Aug. 29, 1972

[54] TINT CONTROL

[72] Inventor: Roy A. Ekstrand, Prospect Heights, Ill.

[73] Assignee: Admiral Corporation, Chicago, Ill.

[22] Filed: April 20, 1971

[21] Appl. No.: 135,663

[52] U.S. Cl. ..............................178/5.4 HE, 307/262

[51] Int. Cl. ............................................H04n 9/12

[58] Field of Search.......178/5.4 R, 5.4 HE; 307/262; 330/12, 40, 130, 135; 332/29

[56] References Cited

UNITED STATES PATENTS 3,527,964 9/1970 Hansen et al.........178/5.4 HE
3,548,215 12/1970 Hoover......................307/262
3,637,922 1/1972 Srivastava ............178/5.4 HE

*Primary Examiner*—Richard Murray
*Attorney*—Pendleton, Neuman, Williams & Anderson

[57] ABSTRACT

A tint control circuit for a color television receiver is described. The hue of the image reproduced on the screen is controlled by a limiting circuit which is incorporated in a transistor amplifier for supplying a reference signal to the color demodulators. The phase of the reference signal is changed, thereby changing the hue, by varying the amount of limiting in the amplifier. The limiting circuit comprises a bias control potentiometer which controls the bias of the transistor and thereby the degree of limiting of the amplifier.

9 Claims, 2 Drawing Figures

INVENTOR
Roy A. Ekstrand
by Pendleton, Neuman, Williams & Anderson
Att'ys

TINT CONTROL

BACKGROUND OF THE INVENTION

This invention relates, generally, to circuit arrangements for shifting the phase of a continuous wave and, in particular, to means for adjusting the hue or tint of a televised image reproduced in color.

Hue adjustment may be provided, according to teachings of the prior art, by shifting the phase of a color reference signal over a small angular range prior to comparing it with chrominance information in a received color signal. Typical prior art circuits are shown in U.S. Pats. No. 2,881,245; No. 3,294,900; No. 3,436,470; and No. 3,454,708.

It is desirable to mount a tint control on the front panel of the television receiver. However, because of radiation problems associated with long cables between the panel-mounted control and the hue controlling circuitry, the control generally consists of a relatively expensive mechanical coupling.

An object of this invention is to provide an improved circuit arrangement for conveniently adjusting the hue of a televised reproduction by a color television receiver.

Another object of the present invention is to provide in a color television receiver, a relatively inexpensive tint control which provides the desirable range of phase shift.

It is a further object of the invention to provide in a color television receiver employing a local reference oscillator, which is locked in phase and frequency to received color burst information signals by means of automatic phase control circuits, a relatively inexpensive tint control for varying the phase of the output signal of the reference oscillator, thereby changing the hue of the televised image.

Further objects of this invention will become manifest from the description, the drawings, and the appended claims.

SUMMARY OF THE INVENTION

In accordance with the present invention, the tint or hue of the television image is changed by introducing a phase shift in the reference signal supplied to the color demodulators. The phase of the reference signal, which is initially phase and frequency locked to a gated burst at 3.58 megahertz obtained from a received color television signal, is shifted over a suitable angle to vary the hue or tint of the reproduced color image. The phase shifting network is incorporated in a continuous-wave amplifier coupled between the output of the local oscillator and an input of the synchronous demodulators. The phase-shifting network is a d.c. network comprising a circuit which acts as a limiter to introduce a distortion in the output signal of the amplifier. As the amplifier is limited, the portion of the oscillator output signal over which linear operation occurs is reduced, and the phase shift between the input and output of the amplifier is increased. A resonant circuit in the output circuit restores the sinusoidal character of the signal.

Prior art d.c. operated tint controls require the use of active devices, most commonly a varying capacitance diode or one or more transistors. The circuit of the present invention requires no active devices in addition to those already included in the amplifier and oscillator and, thereby, provides substantial savings over circuits of the prior art.

Figure 1:
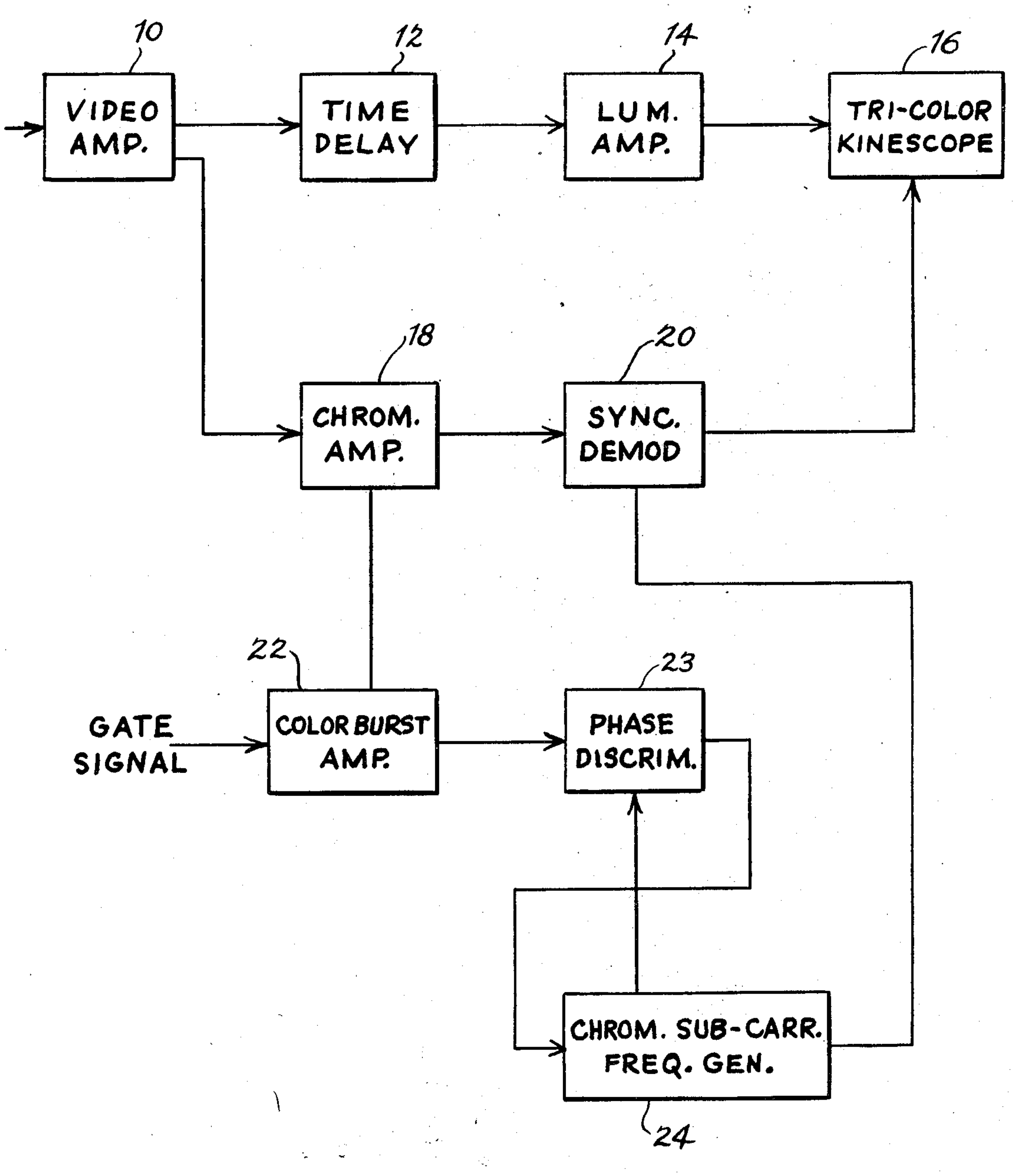
FIG. 1 is a block diagram of a portion of a color television receiver in which the present invention is employed.

The block diagram of FIG. 1 shows the portions of a color television receiver which are involved in the tint control operation. With the exception of the tint control in the frequency generator 24, the circuitry is conventional.

A composite television signal is applied to the input terminals of a video frequency amplifying circuit 10. The luminance component of the composite signal is applied by means of time delay circuit 12 to the input terminals of a luminance signal amplifying circuit 14 for presentation to the input circuit of a tricolor kinescope image reproducing device 16. The composite television signal is also applied from the video amplifier 10 to the input terminals of a chrominance bandpass amplifier 18 which serves to separate and amplify the chrominance signal information. This chrominance information signal is applied to a synchronous demodulating circuit 20.

The chrominance signal is also supplied to the color burst amplifier 22 which is controlled by a gating signal obtained from the deflection circuitry (not shown) and operating at the horizontal repetition rate. The gated color burst appearing at output terminals of gated amplifier 22 is applied to a phase discriminator 23 which compares it with a reference signal generated by a subcarrier frequency generator 24. The output signal of the subcarrier frequency generator is used in the demodulator 20 to obtain the chrominance signal supplied to the kinescope 16. The output has a reference phase and a frequency of 3.58 mhz which is equal to that of the synchronizing burst.

The signals from the generator 24 and the separated burst signal are compared in a phase discriminator 23, which produces a phase control signal for the generator 24.

The principle on which the tint control circuit of this invention relies is that the hue or tint of the reproduced image can be adjusted by changing the phase of the color reference signal generated by the subcarrier generator 24. In the present invention, the phase change is accomplished by introducing a varying degree of distortion into the signal generated by the frequency generator 24. The distortion is preferably accomplished by limiting the operation of an amplifier in the generator 24. A resonant circuit restores the sinusoidal character of the waveform before it is fed to the demodulator 20. The limiting circuit is described with respect to FIG. 2.

Figure 2:
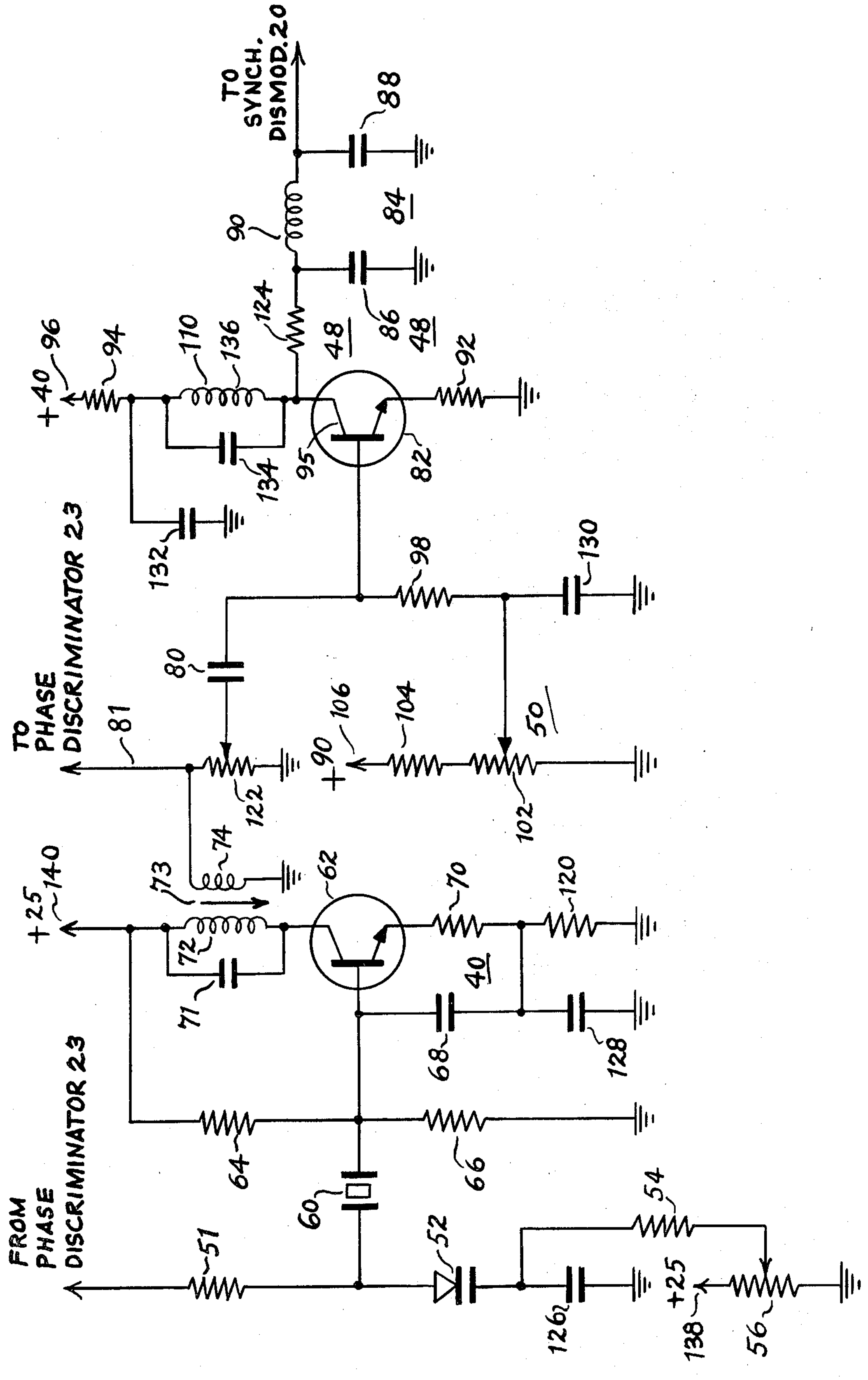
FIG. 2 is a schematic diagram of an embodiment of the tint control circuit of the present invention illustrating in detail portions of the block diagram of FIG. 1.

FIG. 2 shows the subcarrier reference generator employing the tint control circuit of the present invention. The generator includes two basic parts: a color reference oscillator circuit 40, and an amplifier circuit 48. The direct current tint control 50 of the present invention is included in the bias arrangement for the active element of the continuous-wave amplifier 48.

The construction of the generator is as follows.

The oscillator circuit basically includes a resonant crystal 60 (3.58 megahertz) and a transistor 62. The d.c. bias of transistor 62 is fixed by two resistors 64 and 66. Base to emitter feedback is provided by a capacitor 68 and a resistor 70. A tuned circuit including a capacitor 71 cooperating with the primary 72 of a transformer 73 provides a sinusoidal character to the output signal.

The input or control signal to the oscillator 40 is supplied by phase discriminator 23. The signal is an error voltage generated by a comparison of the phase of the gated color burst signal and the output of local oscillator 40, the output of the oscillator 40 being returned to the phase discriminator 23 via lead 81. When a phase difference occurs, a d.c. error voltage is applied through a resistor 51 to a voltage variable capacitor diode 52 having a fixed bias applied to its cathode through resistor 54 and potentiometer 56. The capacitance of the varicap 52 varies with changes in the magnitude of the applied signal. This capacitance resonates with crystal 60 to change the phase and frequency of the output signal of oscillator 40, thereby balancing the output of the oscillator with the gated burst signal.

The output of the local oscillator 40 is coupled to the input of the continuous-wave amplifier 48 by capacitor 80 The signal is amplified by transistor 82 and coupled to the demodulator 20 through an impedance matching filter network 84 including capacitors 86 and 88 and inductance 90.

The biasing network of transistor 82 includes grounded emitter resistor 92, a resistor 94 connected to a d.c. voltage source 96, and a base biasing network comprising resistor 98 and the d.c. tint control 50 of this invention.

The tint control 50 includes a potentiometer 102 having one end connected through a resistor 104 to a source of d.c. voltage 106 (typically 90 volts) and the other end connected to ground. The potentiometer 50 controls the base bias of amplifier transistor 82 and thereby the degree of limiting of continuous-wave amplifier 48. The limiting of the amplifier effects changes in the phase of the color reference signal generated by local oscillator 40. The degree of phase change from reference phase determines the degree of tint control applied.

When no change in the hue or tint of the received television signal is required, the tint control potentiometer 102 is adjusted for linear operation of transistor 82. Thus, the output signal of the oscillator 40 is amplified with a full 180° phase shift; as applied to the demodulator 20, it is in phase with the chrominance signal. Thus, the hue of the image reproduced by the kinescope is the same as the scene televised.

To provide a phase change in the oscillator reference signal with a resulting change in picture tint, the amplifier 48 is limited by adjustment of the base bias of transistor 82. With increasing degrees of limiting, conduction occurs at increasingly delayed points in the driving waveform so that a phase shift progressively greater than the normal 180° occurs from base to collector. Since the phase of the oscillator reference signal has previously been accurately matched to the phase of the chrominance signal, the phase change caused by limiting is proportionately reflected in the change in hue of the reproduced picture. The sinusoidal character of the local oscillator reference signal, which is distorted by this increased limiting action, is restored by the tuned circuit 110 in the collector of amplifier transistor 48 before being coupled to the synchronous demodulator 20. With the tint control of this invention, a phase change of plus or minus 45° is readily obtainable with negligible variation in amplitude insofar as the operation of the color demodulator is concerned.

The following circuit constants are presented as being illustrative of values that may be used in the arrangement of FIG. 2 and are not intended to be limiting in any way:

| | |
|---|---|
| Resistors | |
| R51 | 100 kilohms |
| R54 | 10 kilohms |
| R56 | 25 kilohms |
| R64 | 18 kilohms |
| R66 | 18 kilohms |
| R70 | 15 ohms |
| R92 | 10 ohms |
| R94 | 1 kilohm |
| R98 | 220 ohms |
| R102 | 500 ohms |
| R104 | 6.2 kilohms |
| R120 | 470 ohms |
| R122 | 300 ohms |
| R124 | 1 kilohm |
| Capacitors | |
| C68 | 470 picofarads |
| C71 | 120 picofarads |
| C80 | 470 picofarads |
| C86 | 22 picofarads |
| C88 | 33 picofarads |
| C126 | 0.01 farad |
| C128 | 100 picofarads |
| C130 | 0.1 farad |
| C132 | 0.01 farad |
| C134 | 56 picofarads |
| Inductors | |
| H90 | 82 microhenries |
| H136 | 27 microhenries |
| Bias Voltage Sources | |
| V96 | 40 volts |
| V106 | 40 volts |
| V138 | 25 volts |
| V140 | 25 volts |
| Crystal 60 | 3.58 Megahertz |
| Transistor 62 | MPS6566 |
| Transistor 82 | MPS A20 |
| Varicap 52 | PD 1016 |

While a preferred embodiment of this invention is shown above and described, it will be understood, of course, that the invention is not to be limited thereto; many modifications of the tint control are possible.

What is claimed is:

1. A color television receiver including a kinescope, a chrominance demodulator for supplying demodulated color information to said kinescope, a reference frequency generator for generating a reference frequency signal for said demodulator, said reference frequency generator including an amplifier for amplifying a reference frequency signal applied to the amplifier input, and adjustable means for altering the linearity of said amplifier and thereby introducing a phase change in the amplified reference frequency signal and changing the hue of the reproduced image on said kinescope.

2. The circuit of claim 1 further including a cabinet for the receiver wherein said means for adjusting the linearity of said amplifier is mounted on the front-external portion of said cabinet whereby the linearity can be controlled by the viewer.

3. The circuit of claim 1 wherein said amplifier circuit includes a resonant output circuit for maintaining a sinusoidal waveform in said amplified reference frequency signal.

4. The circuit of claim 1 wherein said adjustable means for altering the linearity of said amplifier includes means for limiting the operation of said amplifier.

5. The circuit of claim 4 wherein said amplifier includes a d.c. biasing network and said limiting means controls the bias of said amplifier.

6. The circuit of claim 5 wherein said amplifier includes a semiconductor device having a base, an emitter and a collector, means for biasing the base-emitter path of said device including a source of d.c. potential and a variable restive network coupled to said source and to the base and emitter junctions of said device whereby the base-emitter bias can be adjusted by adjusting said variable resistive network.

7. In a color television receiver including a kinescope and a demodulator circuit for supplying a demodulated color signal to said kinescope, a chrominance reference frequency generator for generating a reference signal for said demodulator including a reference frequency oscillator generating an output signal at a predetermined reference frequency, a transistor amplifier including a base, emitter and collector, said collector being coupled to a filter network for passing a signal at said reference frequency, the output of said network being coupled to said demodulator, means for coupling the output of said oscillator to the base of said transistor, means for establishing a variable bias voltage for the base-emitter path of said transistor, wherein the range of said variable bias voltage corresponds to both linear and nonlinear operation for said transistor.

8. The circuit of claim 7 wherein said variable bias circuit includes a potentiometer coupled to a source of d.c. voltage, said potentiometer having an adjustable tap coupled to the base of the transistor.

9. The circuit of claim 8 further including a cabinet for said receiver wherein said potentiometer is mounted on the front-external portion of said cabinet and is adjustable by the viewer.

* * * * *